United States Patent [19]

Furuhashi

[11] Patent Number: 4,803,892
[45] Date of Patent: Feb. 14, 1989

[54] MANUALLY OPERABLE DEVICE FOR DISPLACING MOVABLE STAGES

[75] Inventor: Hidehiko Furuhashi, Fujisawa, Japan
[73] Assignee: Nikon Corporation, Tokyo, Japan
[21] Appl. No.: 166,922
[22] Filed: Mar. 11, 1988
[30] Foreign Application Priority Data Mar. 30, 1987 [JP] Japan ................... 62-77036

[51] Int. Cl.$^4$ ............................................. G02B 21/26
[52] U.S. Cl. ........................................ 74/479; 74/531;
350/531; 188/83
[58] Field of Search .............. 74/479, 531, 10.45;
350/530, 531; 188/83

[56] References Cited

U.S. PATENT DOCUMENTS

| | | | |
|---|---|---|---|
| 1,141,230 | 6/1915 | Burke | 188/83 |
| 2,642,503 | 6/1953 | Dietrich | 74/531 |
| 3,826,559 | 7/1974 | Berliner et al. | 350/530 |
| 3,987,687 | 10/1976 | Bland et al. | 74/531 |
| 4,003,628 | 1/1977 | Halperin | 350/530 |
| 4,402,576 | 9/1983 | Stahl et al. | 350/531 |
| 4,445,758 | 5/1984 | Emmel | 350/531 |
| 4,615,592 | 10/1986 | Schob et al. | 350/531 |
| 4,616,517 | 10/1986 | Esmay | 350/530 |
| 4,660,942 | 4/1987 | Hill | 74/479 |
| 4,700,585 | 10/1987 | Marzhauser | 350/531 |

FOREIGN PATENT DOCUMENTS 55-45365 10/1980 Japan .
56-11048 3/1981 Japan .

Primary Examiner—Lawrence Staab
Attorney, Agent, or Firm—Shapiro and Shapiro

[57] ABSTRACT

A manually operable device for displacing movable stages includes first and second assemblies each comprising a main handle and a sub handle. A first pinion shaft is extended through both the handle assemblies and its lower end is fixedly secured to a sub handle of the first handle assembly. A second pinion shaft is rotatably provided about the first pinion shaft and its lower end is made integral with a main handle of the second handle assembly. Pinions provided at the upper ends of each shaft mesh with racks for displacing a movable stage in first and second orthogonal directions. The first and second pinion shafts have a threaded part at their lower end parts. The threaded part of the first pinion shaft is threadably engaged to a sub wheel of the first handle assembly, whereas the threaded part of the second pinion shaft is threadably engaged to a sub wheel of the second handle assembly. A spring washer is disposed between the main wheel and the sub wheel of each of the first and second handle assemblies to provide frictional engagement therebetween. Additional spring washers are positioned between each sub handle and a stationary flange to form friction couples therebetween. Adjusting of a couple is independently achieved for the first and second handle assemblies in such a manner that the sub handle is rotated by one hand while the main handle is retained with other hand of an operator.

5 Claims, 2 Drawing Sheets

MANUALLY OPERABLE DEVICE FOR DISPLACING MOVABLE STAGES

BACKGROUND OF THE INVENTION

1. Field of the Invention

The present invention relates to a manually operable device for displacing movable stages or the like member on a microscope, particularly to a manually operable device of the type including a couple adjusting unit for varying an intensity of couple for an operating handle as required.

2. Related Background Art

As a manually operable device of this type, there have been heretofore known those as disclosed in, for instance, an official gazette of Japanese Utility Model Publication No. 11048/1981 and an official gazette of Japanese Utility Model Publication No. 45365/1980. A device as disclosed in the former official gazette includes a pinion shaft rotatably supported on a stationary shaft, a pinion provided on one end of the pinion shaft to mesh with a rack on a movable stage, a handle threadably engaged to a threaded part formed on other end of the pinion, a friction member disposed between the stationary shaft and the handle for adjusting a couple for the handle, and a frictional force adjusting member disposed integral with the handle for adjusting a frictional force developed between the threaded part of the pinion shaft and the handle. According to the prior invention, adjusting of an intensity of couple for the handle is achieved by rotating the handle by one hand while the movable stage is retained with other hand of an operator. Specifically, since the pinion shaft is kept immovable because the movable stage is retained, the handle is displaced along the threaded part in the axial direction of the pinion shaft and a load exerted on the friction member in the direction of thrusting varies in dependence on a distance of displacement of the handle whereby a couple for the handle is adjusted.

However, the device for adjusting a couple as disclosed in the official gazette of Japanese Utility Model Publication No. 11048/1980 has such a drawback that the position of the handle relative to the couple adjusting member as seen in the axial direction should be previously adjusted prior to assembling operation, causing the device to become complicated in structure and moreover require a number of manhours for assembling and adjusting. Further, another drawbacks of the conventional device are that couple adjusting operation is performed with much difficulties because the position of the handle relative to the pinion shaft as seen in the axial direction is adjusted by rotating the threadably fitted part at which the pinion shaft is threadably fitted to the handle under the influence of a high intensity of frictional force so as to adjust the position of the handle relative to the pinion shaft as seen in the axial direction, and moreover teeth on a rack made of synthetic resin or the like material are susceptible to injury during adjusting operation.

On the other hand, the manually operable device as disclosed in the official gazette of Japanese Utility Model Publication No. 45365/1980 is so constructed that a cylindrical bearing for rotatably supporting a pinion shaft adapted to rotate together with a handle has a threaded part formed at one end thereof, a couple adjusting member adapted to be threadably engaged to the threaded part is disposed in an area located in the proximity of the handle, and the handle is displaced in the direction of thrusting by rotating the couple adjusting member so as to adjust a couple for the handle but the couple adjusting member is inhibited from rotating during rotational operation of the handle.

However, a couple adjusting unit incorporated in the last-mentioned manually operable device has a drawback that when fingers of an operator come in contact with the couple adjusting member by mistake while the handle is rotated to displace the movable stage, there is a fear that the couple adjusting member is rotated together with the handle, resulting in a couple for the hand which has been properly adjusted getting out of order.

SUMMARY OF THE INVENTION

The present invention has been made with the foregoing background in mind and its object resides in providing a manually operable device for displacing movable stages which is entirely free from the drawbacks inherent to the conventional devices and is simple in structure and which assures that assembling and couple adjusting can be easily achieved, couple adjusting can be achieved without a high intensity of force exerted on components constituting movable stages such as rack and others with the exception of handles and a couple which has been once adjusted does not get out of order inadvertently.

To accomplish the above object, the present invention provides a manually operable device for displacing movable stages which is so constructed that a first stage movable in one direction and a second stage disposed on the first stage to move in other direction oriented at a right angle relative to the direction of movement of the first stage are controlled independently. The first stage includes a vertically extending support shaft having a flange secured thereto at one end thereof. A first rotational shaft for displacing the second stage is extended through the support shaft and a second rotational shaft for displacing the first stage is rotatably provided about the outer surface of the support shaft. The first and second rotational shafts are fixedly provided with a main handle respectively, and couple adjusting means including a sub handle which is displaceable in the axial direction relative to each of the main handles while it is rotated is provided in an area as defined between each of the main handles and the flange on the support shaft in order to achieve couple adjusting. Rotation of the main handle relative to the sub handle is inhibited with the use of frictional engaging means. Usually, they are rotated together, but they are not relatively rotatable only when couple adjusting is effected.

Since the manually operable device of the invention is constructed in the above-described manner, a couple can be adjusted as required by rotating the sub handle relative to the main handle. Consequently, a couple suitable for an operator can be easily obtained at any time. Further, the first stage and the second stage can be independently displaced by rotating the main handle and the sub handle together. Since rotation of the main handle relative to the sub handle is inhibited with the use of the frictional engaging means, there is no fear that a couple which has been once adjusted gets out of order. Further since couple adjusting is achieved in such a manner that the sub handle is rotated by one hand while the main handle is retained with other hand of an operator, there is no fear that a gear mechanism for transmitting rotation of the sub handle to the stage is damaged or injured during couple adjusting operation.

Other objects, features and advantages of the present invention will become readily apparent from a reading of the following description which has been made with reference to the accompanying drawings.

DESCRIPTION OF THE PREFERRED EMBODIMENT

Figure 1:
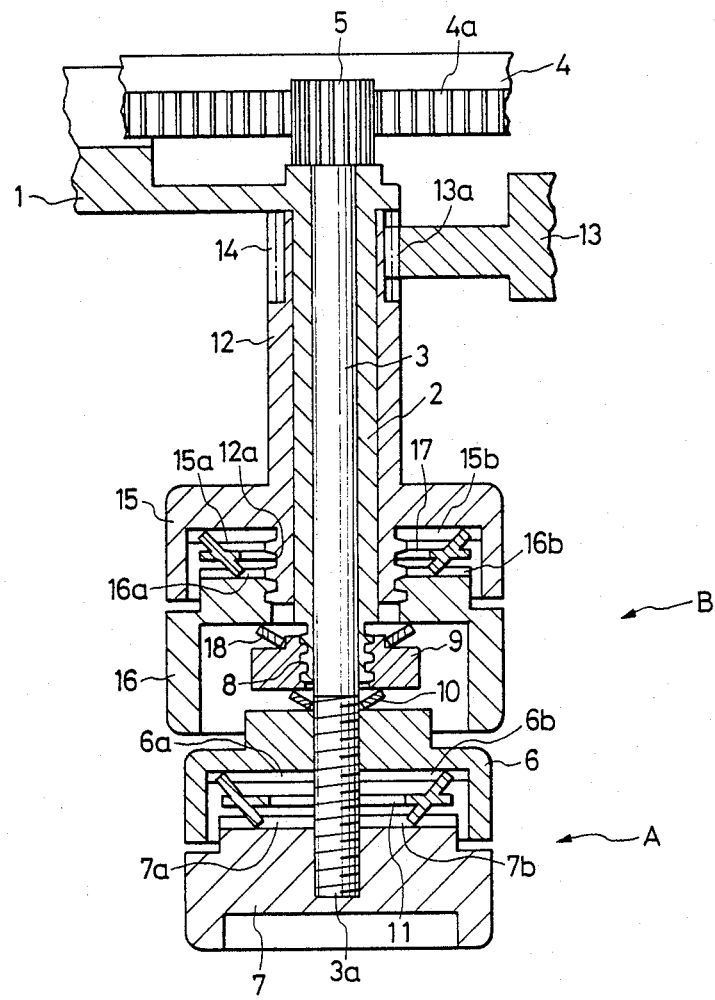
FIG. 1 is a sectional view of a manually operable device in accordance with an embodiment of the invention.
Figure 2:
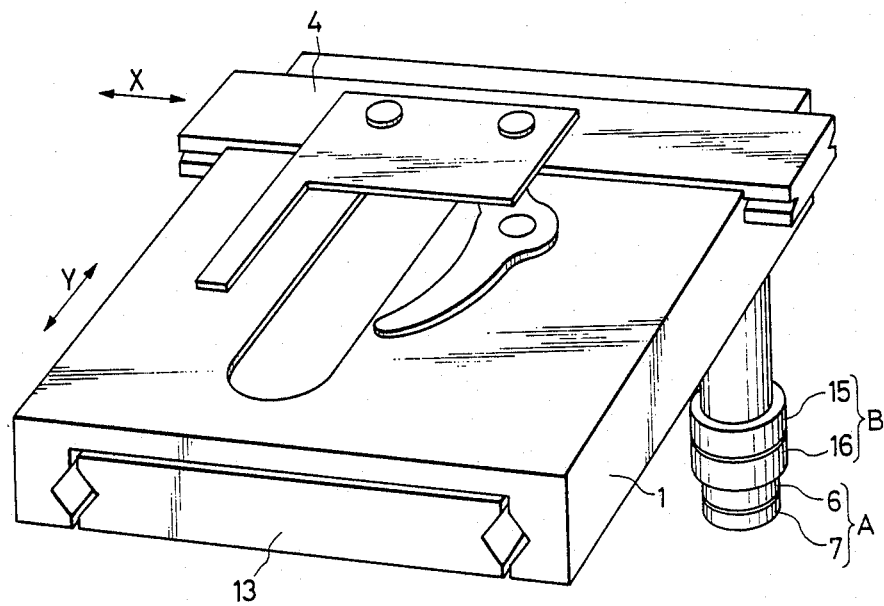
FIG. 2 is a perspective view of movable stages with the manually operable device in FIG. 1 incorporated therein.

Now, the present invention will be described below in a greater detail with reference to the accompanying drawings, particularly FIG. 1 and FIG. 2.

A first pinion shaft 3 is rotatably supported in the interior of a hollow cylindrical shaft 2 which is made integral with a first movable stage 1 adapted to move on the stationary part of a housing of a microscope. A first pinion 5 adapted to mesh with a rack 4a generated on a second movable stage 4 adapted to move in a direction (X-direction) oriented at a right angle relative to the direction (Y-direction) of movement of the first stage 1 is generated at the upper end part of the first pinion shaft 3 as viewed in FIG. 1. A threaded part 3a is formed on the lower end part of the first pinion shaft 3. A sub X-handle (hereinafter referred to as a first handle) 6 and a main X-handle (hereinafter referred as a second handle) 7 are threadably engaged to the threaded part 3a. The second handle 7 is immovably mounted on the first pinion shaft 3 with the aid of an adhesive or the like means when it is threadably engaged to the threaded part 3a. A flange 9 is immovably mounted on a threaded part 8 formed on the lower end of the hollow cylindrical shaft 2 with the aid of an adhesive or the like means.

Figure 3:
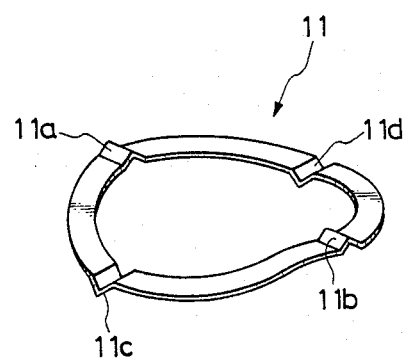
FIG. 3 is a perspective view of a spring washer.

A first spring washer 10 is held between the flange 9 and the first handle 6 whereby a resilient force of the first spring washer 10 is imparted to the first handle 6. A second spring washer 11 is held between the first handle 6 and the second handle 7, and an intensity of friction force of the second spring washer 11 is set larger than an intensity of friction force of the first spring washer 10 in order to assure that the first handle 6 is rotated as the second handle 7 is rotated. As shown in FIG. 3, the second spring washer 11 is formed with a plurality of projections 11a to 11d on the upper and lower surfaces thereof. As is apparent from the drawing, the projections 11a and 11b are provided on the upper surface and the projections 11c and 11d are provided on the lower surface of the second washer 11. A plurality of radially extending grooves (merely two grooves 6a and 6b are shown in FIG. 2) are formed on a thrust receiving surface of the first handle 6 so that the projections 11a and 11b on the second spring washer 11 are engaged to the grooves. Further, a plurality of radially extending grooves (merely two grooves 7a and 7b are shown in FIG. 1) are formed on a thrust receiving surface of the second handle 7 so that the projections 11c and 11d on the second spring washer 11 are engaged to the grooves. A friction force developed on the thrust receiving surfaces of the handles 6 and 7 becomes larger by allowing the projections 11a to 11d to be engaged to the grooves 6a, 6b, 7a and 7b whereby displacement of the handle 7 relative to the handle 6 as seen in the peripheral direction is inhibited. The first handle 6 and the second handle 7 constitute a first handle assembly A.

Further, a second pinion shaft 12 is rotatably supported on the outer surface of the hollow cylindrical shaft 2, and a second pinion 14 adapted to mesh with a rack 13a generated on the side face of a stationary part 13 of the housing of the microscope is generated on the upper end part of the second pinion shaft 12. A main Y-handle (hereinafter referred to as a third handle) 15 is made integral with the second pinion shaft 12, and a sub Y-handle (hereinafter referred to as a fourth handle) 16 is threadably engaged to a threaded part 12a formed on the lower end part of the second pinion shaft 12 in such a manner that the threaded part 12a is covered with the third handle 15. A third washer 17 having the same shape as that of the second spring washer 11 is held between the third handle 15 and the fourth handle 16. A plurality of radially extending grooves (merely two grooves 15a and 15b are shown in FIG. 1) are formed on a thrust receiving surface of the third handle 15 in the same manner as the grooves 7a and 7b of the second handle 7. Further, a plurality of radially extending grooves (merely two grooves 16a and 16b are shown in the drawing) are formed on a thrust receiving surface of the fourth handle 16 in the same manner as the grooves 6a and 6b of the first handle 6. A plurality of projections formed on the third washer 17 are engaged to the above-mentioned grooves. A fourth spring washer 18 is held between the fourth handle 16 and the flange 9, and an intensity of friction force generated by the fourth spring washer 18 is set smaller than that of friction force generated by the third spring washer 17. The third handle 15 and the fourth handle 16 constitute a second handle assembly B.

Next, operation of the device of the invention as constructed in the above-mentioned manner will be described below. First, description will be made as to how the second movable stage 4 is displaced. To this end, it suffices that either of or both of the first handle 6 and the second handle 7 are rotated simultaneously. It should be noted that the first handle 6 and the second handle 7 are rotated together under the effect of friction force of the second spring washer 11. When the second handle 7 is rotated, the first pinion 5 is rotated whereby the second movable stage 4 is displaced in the X-direction as viewed in FIG. 2 via the rack 4a. Further, when the third handle 15 or the fourth handle 16 is rotated, the third handle 15 and the fourth handle 16 are rotated together under the effect of friction force of the third spring washer 17. As the third handle 15 is rotated, the second pinion 14 is rotated whereby the first movable stage 13 is displaced in the Y-direction oriented at a right angle relative to the X-direction of movement of the second movable stage 4 (in the vertical direction relative to the plane of the paper of FIG. 1) via the rack 13a.

Next, operation for adjusting a couple of each of the first handle assembly A and the second handle assembly B will be described below.

First, description will be made as to how a couple of the first handle assembly A is adjusted. While the second handle 7 is retained with one hand, the first handle 6 is rotated by other hand of an operator. At this moment, the projections 11a to 11d on the first spring washer 11 are disengaged from the grooves 6a, 6b, 7a and 7b. When the first handle 6 is rotated further, the projections 11a to 11d are engaged to other grooves located adjacent to the first-mentioned grooves. As the first handle 6 is rotated, it is displaced along the threaded part 3a of the first pinion shaft 3 in the axial direction with the result that a distance between the first handle 6 and the flange 9 varies. At this moment, a friction force to be imparted to the first handle 6 by the first spring washer 10 varies correspondingly, because the flange 9 which resiliently holds the first spring washer 10 in cooperation with the first handle 6 is kept immovable. Thus, a couple of the first handle assembly A is adjusted as required. Since the first pinion shaft 3 is not rotated during the operation for adjusting a couple, there is no fear that the rack 4a is injured by the adjusting operation.

Also in a case where a couple of the second handle assembly B is adjusted, adjusting operation is performed in the same manner as mentioned above. Namely, while the third handle 15 is retained with one hand, the fourth handle 16 is rotated by other hand of an operator. At this moment, the projections on the third spring washer 17 are disengaged from the grooves 15a, 15b, 16a and 16b. When the fourth handle 16 is rotated further, the projections are engaged to the grooves located adjacent to the first-mentioned grooves. As the fourth handle 16 is rotated, it is displaced along the threaded part 12a in the axial direction with the result that a distance between the fourth handle 16 and the flange 9 varies. Consequently, a friction force to be imparted to the fourth handle 16 by the fourth spring washer 18 varies correspondingly. Thus, a couple of the second handle assembly B is adjusted as required. Since the second pinion shaft 12 is not rotated during the operation for adjusting a couple, there is no fear that the rack 13a is injured by the adjusting operation.

The foregoing embodiment is concerned with a device for displacing two movable stages in two directions. However, the present invention should not be limited only to this. Alternatively, the present invention is applicable to a case where a movable stage is displaced only in one direction of X- and Y-directions. Further, the present invention is applicable also to a case where each of the handles 6, 7, 15 and 16 is not formed with any groove and the second spring washer 11 and the third spring washer 17 are not formed with any projection but simple spring washers such as waveshaped spring washer or the like are employed in place of the second spring washer 11 and the third spring washer 17.

Incidentally, in the foregoing embodiment, the second handle 7 is threadably engaged to the threaded part 3a of the first pinion shaft 3 and the fourth handle 16 is threadably engaged to the threaded part 12a of the second pinion shaft 12. Since it suffices that a couple is adjusted by constructing the device in such a manner that the second handle 7 is rotated and axially displaced relative to the first handle 6 and the fourth handle 16 is rotated and axially displaced relative to the third handle 15, adjusting of a couple and displacing of the movable stages may be achieved by threadably engaging the first handle 6 directly to the second handle 7 and threadably engaging the third handle 15 directly to the fourth handle 16 with the use of screw means.

According to the present invention as described above, a couple can be adjusted simply by rotating a sub handle while a main handle is retained. Thus, a couple suitable for an operator can be easily obtained at any time without any occurrence of damage or injury of pinion or the like component as is often the case with the conventional device. Further, since there is no need of adjusting a friction force for the handle and the pinion shaft during assembling operation, there is provided a device for displacing movable stages which does not require any complicated operation for assembling of the device.

I claim:

1. A manually operable device for displacing a first stage in one direction and displacing a second stage movably disposed on said first stage in other direction oriented at a right angle relative to the direction of movement of the first stage comprising:
    a support shaft provided on the first stage and having a flange fixedly secured thereto at one end;
    a first rotational shaft rotatably provided through said support shaft to displace said second stage;
    a second rotational shaft rotatably provided about the support shaft for displacing said first stage;
    a pair of main handles fixedly mounted on said first rotational shaft and said second rotational shaft for performing rotational operation, respectively;
    first couple adjusting means provided between one of said pair of main handles and said flange and including a first sub handle being rotatable and axially displaceable relative to said one main handle;
    second couple adjusting means provided between other one of said pair of main handles and said flange and including a second sub handle being rotatable and axially displaceable relative to said other main handle; and
    frictional engaging means for inhibiting rotation of each of the main handles relative to the corresponding sub handle so as to allow each of the main handles and the corresponding sub handle to be rotated together.

2. The manually operable device of claim 1 wherein said frictional engaging means comprises two resilient members provided between said one main handle and said first sub handle and between said other main handle and said second sub handle, respectively.

3. The manually operable device of claim 2 wherein said first couple adjusting means further includes first resilient means held between said first sub handle and the flange and adapted to urge said first sub handle in the axial direction and to create friction between said first sub handle and said flange, and said second couple adjusting means further includes second resilient means held between said second sub handle and the flange and adapted to urge said second sub handle in the axial direction and to create friction between said second sub handle and said flange.

4. The manually operable device of claim 3 wherein said friction engaging means creates a frictional force of which intensity is larger than that of each of said first and second resilient means.

5. The manually operable device of claim 4 wherein each of said first and second rotational shafts includes a threaded part to which said first and second sub handles are threadably engaged so as to allow said sub handles to be rotated and axially displaced, respectively, and a couple of each of the main handles is independently adjusted by varying an urging force of the corresponding resilient member in dependence on an amount of relative displacement of the corresponding sub handle when the latter is displaced relative to the main handle against said frictional force of the corresponding resilient member.

* * * * *